Dec. 30, 1947.  C. A. BROWN  2,433,732
VALVE
Filed Aug. 27, 1943  2 Sheets-Sheet 1
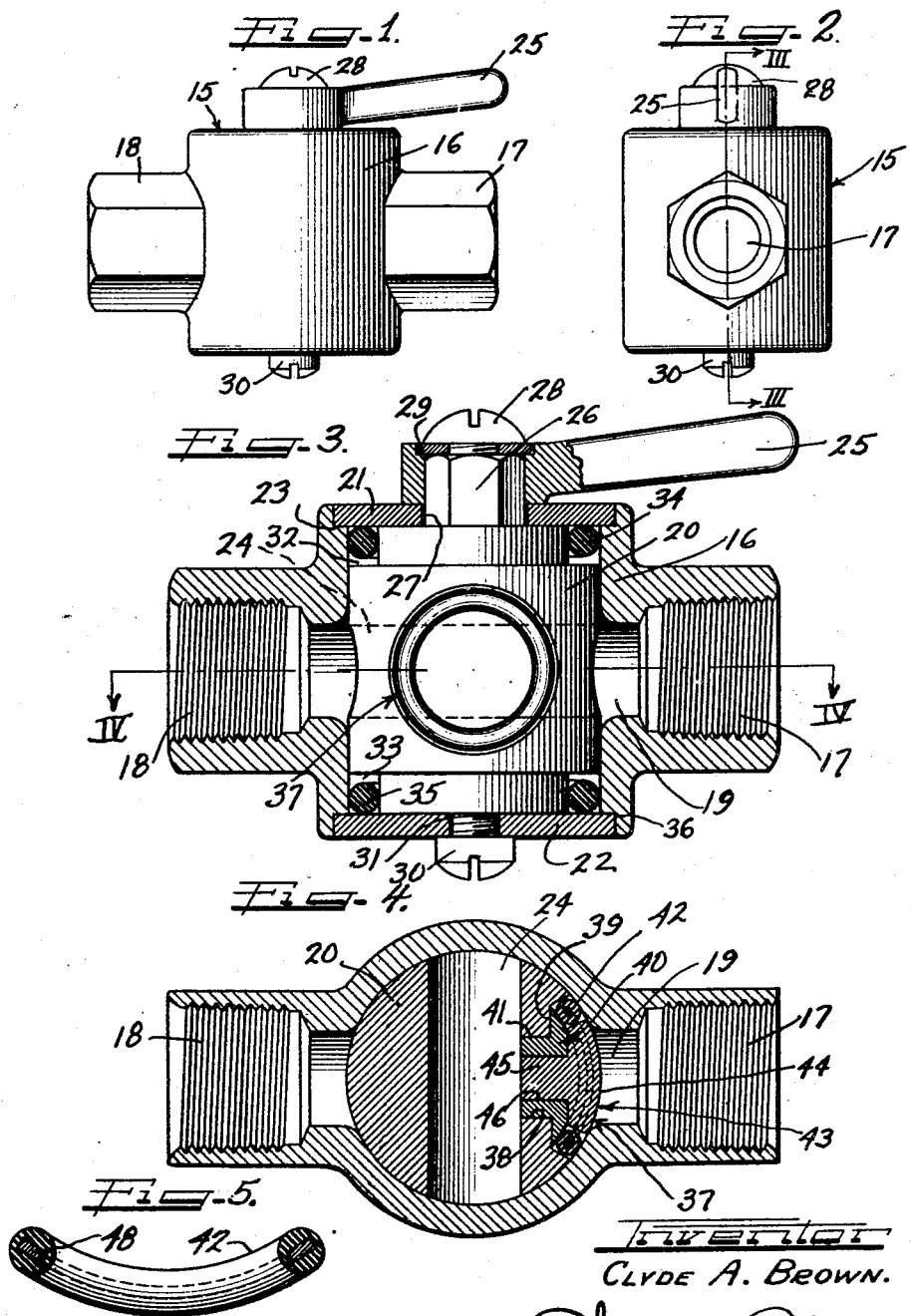
Inventor
CLYDE A. BROWN

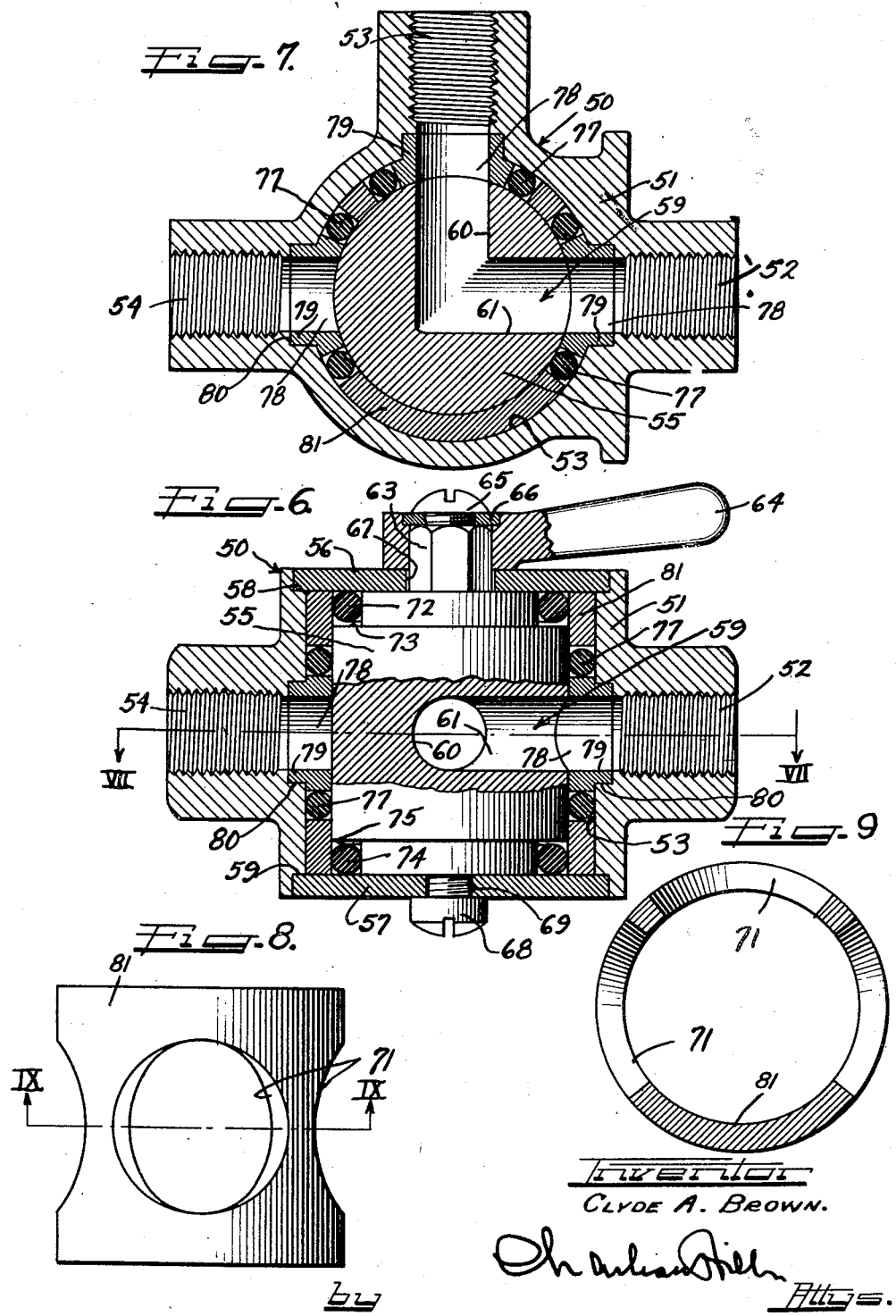

Patented Dec. 30, 1947

2,433,732

UNITED STATES PATENT OFFICE 2,433,732

VALVE

Clyde A. Brown, Chicago, Ill., assignor to The Dole Valve Company, Chicago, Ill., a corporation of Illinois Application August 27, 1943, Serial No. 500,208

9 Claims. (Cl. 251—103)

1

The present invention relates to a valve. More particularly, the invention concerns a valve structure embodying a sealing means formed of moldable non-metallic plastic material which cooperates with at least one of the ports in the valve chamber to prevent leakage between the valve body and the valve chamber.

It is an object of the present invention to provide a valve which is simple and economical to manufacture and yet insures a completely leak-proof structure.

It is a further object of the present invention to provide a valve structure embodying a preformed sealing means which surrounds at least one of the ports of said valve and cooperates with the body and the chamber to prevent leakage therebetween.

It is also an object of the present invention to provide a valve in which such sealing means may be associated either with the valve body or with the chamber for cooperation with the other of said members.

It is a further object of the present invention to provide a valve body or a valve chamber with which a sealing means is associated in complementary relation.

It is a still further object of the present invention to provide a preformed gasket or sealing means of moldable synthetic plastic material which possesses a configuration adapted to complement the form of the valve element with which it is associated.

It is a still further object of the present invention to provide a preformed gasket or sealing means of moldable synthetic plastic material which has an internal reinforcement of a material which differs from that forming the exterior thereof.

In accordance with the general features of the present invention there is provided a valve structure which comprises a chamber having a plurality of fluid ports, a body adjustably disposed within said chamber for opening and closing said ports, and means cooperating with said body and said chamber for sealing at least one of the fluid ports so as to prevent leakage between the body and the chamber of the valve structure.

Still other objects and advantages will become apparent from the following description of one embodiment of the present invention illustrated in the accompanying drawings, in which:

Figure 1 represents an elevation of a typical valve structure embodying the principles of the present invention;

2

Figure 2 is an end elevation of the valve structure of Figure 1;

Figure 3 is a vertical section at a somewhat larger scale as seen from the line III—III of Figure 2 with parts in elevation;

Figure 4 is a horizontal section of the valve unit of Figure 3 as seen from the line IV—IV therein;

Figure 5 is a segment of one form of gasket or sealing means adapted to be employed in the valve structure of Figures 1 to 4, inclusive;

Figure 6 represents a vertical section taken through a typical three-way valve structure embodying an internal sleeve;

Figure 7 is a horizontal section as seen substantially from the line VII—VII in Figure 6;

Figure 8 is an elevation of the internal sleeve employed in the valve illustrated in Figure 6; and Figure 9 is a horizontal section through the sleeve taken along the line IX—IX of Figure 8.

Figures 1 to 5, inclusive, of the drawings illustrate one embodiment of the present invention. The valve unit 15 comprises a casting 16 which is provided with a plurality of inlet and outlet ports, in this case, an inlet 17 and an outlet 18 which may be internally threaded or provided with other suitable coupling means for connecting pipes or other suitable forms of conduit thereto. As will be seen from Figure 3 of the drawings, casting 16 in which is formed a chamber 19 housing the valve body such, for example, as the plug 20 and closed at the top and bottom thereof by the plates 21 and 22 which are supported in the casing 16 by the shoulders 23 and 36, respectively, in said casting 16.

The plug 20 which is generally cylindrical in shape is provided with a horizontally extending passageway 24 adapted to communicate with the inlet 17 and outlet 18 in the casting 16 when the valve is opened. The plug 20 is rotatably mounted about its vertical axis and is capable of being adjusted as by means of handle 25 which is secured to a stud 26 of octagonal shape formed on one end of the plug 20 so as to project through an opening 27 in the upper plate 21. The handle 25 is secured to the stud 26 as by means of the bolt 28 and the countersunk washer 29. It will be understood that the handle 25 may also serve to hold the upper plate 21 against the shoulder 23. In like manner, a bolt 30 which extends through aperture 31 in lower plate 22 and is threaded into the end of the plug 20 opposite to that upon which the handle 25 is mounted serves to position the lower plate 22 against the shoulder 24 and also to position the plug 20 in pivotal relation within the chamber 19.

In order to prevent the escape from the chamber 19 of the fluid for the control of which the valve is designated, an annular shoulder 32 is formed on that end of the plug 20 adjacent the mounting of the handle 25 and cooperates with a suitable packing ring 34 to seal the upper end of the valve. A similar annular shoulder 33 and a cooperating packing ring 35 is provided at the opposite end of the plug 20 to assist in guarding against the possibility of leakage of fluid at the lower plate 22.

To provide additional protection against the possibility of leakage of the fluid from the valve when the plug 20 is adjusted to its closed position as indicated in Figure 4 of the drawings so that the axis of the passageway 24 in the plug 20 is substantially at right angles with the longitudinal axis of the valve extending from the inlet 17 to the outlet 18, a suitable means may be provided in said plug 20 to seal the inlet port 17.

As shown in Figures 3 and 4 of the drawings, this sealing means may advantageously take the form of the assembly 37. The assembly 37 is illustrated as being inserted in a bore 38 cut into the wall of the plug 20 substantially at right angles to the axis of the passageway 24 therein. The bore 38 is provided with an annular shoulder 39 against which is supported the flanged member 40, the shank portion 41 of which extends through to the base of the bore 38. A sealing ring 42 which may advantageously be of generally circular shape but preformed into a concavo-convex form is supported in the bore 38 by the flanged member 40, being held in place therein by an insert 43 which has an external face 44 of substantially arcuate form to cooperate with the periphery of the plug 20 and a base portion 45 which extends through to the base of an internal bore 46 in the flanged member 40.

It will be apparent that the sealing ring 42 may take any one of several suitable forms other than that illustrated in the assembly 37 for effectively sealing the valve 15. The ring is, however, illustrated as being formed of a suitable moldable non-metallic plastic material such for example as rubber, neoprene, or other like substances. The fact that the ring 42 cooperates with the other parts of the assembly 37 to form the outer cylindrical wall of the plug 20, accounts for the preferred concavo-convex form thereof. The ring 42 may advantageously be molded of a single material or, alternatively, may be provided with an internal reinforcement of the nature of the core 48, which may best be seen in Figure 5 of the drawings. This reinforcement or core 48 for the ring 42 may be of any suitable material which will aid the ring to retain its shape. The core 48 may, for example, take the form of a metal ring or may be made of any suitable plastic material preferably dissimilar from that which forms the outer portion of the ring 42 for the reason that it is desired to provide a relatively pliable material at the exterior thereof to afford effective sealing of the valve structure.

The sealing ring 42 embodies a unique principle in that as the pressure of the fluid on the valve structure increases, the sealing effect likewise increases. That is to say, the sealing effect of the ring 42 is proportioned to the pressure differential across said ring. This action of sealing ring 42 insures against leakage in the valve structure with exceedingly high pressures.

It will be readily understood that the material employed in the fabrication of the ring 42 must necessarily be chosen with regard to the character of the fluid to be handled by the valve. For instance, a different material may be required for a valve intended to handle natural gas from that of a valve intended to control the flow of water, oil or similar liquids. Molded rubber with a suitable reinforcement may readily be employed herein by reason of the fact that the material comprising the ring 42 will in normal use be frequently worked so that it may be expected to retain its resilience and pliability for a relatively long period of time since the working of such material enhances its life. Neoprene is another example of a suitable material by reason of its ability to withstand wear and attack by certain fluids which such valves may handle.

Another embodiment of the present invention is illustrated in Figures 6 and 7 of the drawings in which sealing means of the type contemplated by the present invention are adapted to use in a three-way sleeve type valve 50 in which the casting 51 is provided with a plurality of ports 52, 53 and 54, each of which are suitably internally threaded for connection to pipe lines or other forms of conduits. The casting 51 has an internal chamber 53 in which is disposed a substantially cylindrical sleeve member 81 and an adjustable plug 55, both of which are held in place in the chamber 53 as by means of the upper plate 56 and lower plate 57 supported in said casting 51 by the shoulders 58 and 59, respectively, formed therein.

The plug 55 is provided with a passageway 59 extending therethrough and made up of the branches 60 and 61 which are illustrated as being disposed at right angles to each other thus enabling communication between any two of the three ports 52, 53 and 54, as may be desired. As in the case of the embodiment illustrated in Figures 1 to 4, inclusive, the plug 55 of the present valve is provided with an octagonally shaped stud 63 formed at one end thereof which is adapted to cooperate with a similarly formed opening in the handle 64 fitted thereon and held in place by a bolt 65 and a washer 66 recessed in the end of the handle 64. The mounting of the handle 64 serves to hold the upper plate 56 against the shoulder 58 in the casting 51 while the lower plate 57 is positioned against its shoulder 59 as by means of the bolt 68 extending through a hole 69 in said plate 57 and being threaded into the base of the plug so that it also assists in positioning said plug 55 for rotation about its vertical axis.

In order to prevent the possibility of leakage of the fluid from the chamber 53 of the casting 51 adjacent the upper plate 56 or through the opening 67 therein there is provided a packing ring 72 held in position against the inner periphery of the sleeve 81 and the under side of the upper plate 56 by means of the annular shoulder 73 formed on the upper end of the plug 55. A similar construction embodying the packing ring 74 held in place by an annular shoulder 75 on the lower end of the plug 55 serves to prevent the possibility of leakage of the fluid from the chamber 53 adjacent the lower plate 57 or through the hole 69 therein when the valve 50 is in use.

The sleeve 81 which is shown in detail in Figures 8 and 9 of the drawings is provided with a number of openings 71 corresponding to the number of ports provided in the casting 51, in this case, ports 52 to 54, inclusive. A plurality of preformed sealing rings 77, one for each of the ports 52, 53 and 54, are provided for the purpose of cooperating with the casting 51, the sleeve 81 and the plug 55 to prevent leakage of fluid therebetween. The sealing ring 77 for each port is disposed in the opening 71 corresponding thereto in the sleeve 81 and is positioned therein by any suitable means such, for example, as the flanged insert 78, the shank portion 79 of which registers with an annular recess 80 formed in the inner wall of the chamber 53 of the casting 51 adjacent each of the ports 52, 53 and 54.

It will be noted that the sealing ring 77 of the embodiment of the invention illustrated in Figures 6 and 7 is shown as being fabricated wholly of a single material. It will be understood that the sealing ring 77 may take the form of that illustrated in Figure 5. Due, however, to the presence of the sleeve member 81 there will be less necessity for providing an internal reinforcement for the sealing ring 77 since the sleeve 81 tends to cause the sealing ring 77 to retain its shape more readily.

It will be understood that the sealing rings 42 and 77 shown in the illustrated embodiments of the invention are adapted to be fitted loosely in place in the valve structure. The rings are merely centered by the guides provided and held in place between the cooperating internal valve surfaces. In this way they will be free to respond to pressure or any variation in pressure at the port or ports with which they are associated. As the fluid under pressure contacts the resilient sealing rings, it operates to force the relatively pliant material of the ring against the joints between valve elements from which the fluid tends to escape and thereby seals these points thoroughly.

This principle differs materially from that encountered in conventional valve units in that the packing means customarily are tightly packed or secured in place between the movable parts of the structure. With such rigid or inflexible packings after repeated operation of the valve, the fluid tends to channel and leakage frequently results becoming increasingly worse as the pressure at the ports becomes greater. Contrarily, by virtue of the resilience of the sealing ring of the present invention, it is enabled to adjust itself repeatedly to conform to the conditions applying to the valve structure in which it is employed. Thus, the sealing effect of my sealing ring increases as the pressure in the valve unit increases.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A valve comprising a chamber having a plurality of fluid ports, a body adjustably disposed in said chamber for opening and closing said ports, and a substantially annularly shaped sealing means of concavo-convex configuration in the plane of the face thereof fabricated of moldable synthetic plastic material having an internal reinforcement of a material which differs from that of the exterior thereof, said sealing means encircling at least one of the fluid ports for cooperating with the body and the chamber to prevent leakage therebetween when the valve is closed, said sealing means comprising a ring normally of substantially circular cross section but being deflectible in response to fluid pressure at the associated port to an oval cross section.

2. A plug valve comprising a chamber having a plurality of fluid ports, a plug adjustably disposed in said chamber for opening and closing said ports, a generally circular groove cut in the outer wall of said plug, an annular sealing means of substantially circular cross section disposed in said groove and encircling at least one of said ports and deflectible under fluid pressure to an oval cross section to prevent leakage between said plug and said chamber when the valve is closed by establishing a tighter fit between said plug and said chamber as the fluid pressure at the port increases.

3. A valve comprising a chamber having a plurality of fluid ports, a sleeve disposed in said chamber having openings therein corresponding to the ports in said chamber, a body adjustably positioned in said sleeve for controlling the flow of fluid through said ports, and sealing means of substantially circular cross section associated with said sleeve and encompassing at least one of said ports for cooperating with said body and said chamber to prevent leakage therebetween when the body is disposed in closed position in said chamber.

4. A valve or the like comprising a chamber having a plurality of fluid ports, a sleeve disposed in said chamber having a plurality of openings therein corresponding to the ports in said chamber, a body adjustably positioned in said sleeve for opening and closing said ports, a sealing means associated with each of the openings in said sleeve, and an insert in each port to position said sealing means about said port for cooperating with said body and said chamber to prevent leakage therebetween when the valve is closed.

5. A valve body having a passage extending therethrough, an opening in the wall of said body extending into said passage and substantially at right angles to the axis thereof, an annular flanged member having an internal bore disposed in said opening, a preformed sealing means mounted in said opening and supported by said annular flanged member and an insert which registers with the bore in said flanged member for positioning said sealing means and complementing the outer wall of said valve body.

6. In a valve structure, a chamber member having a fluid port therein, a body member adjustably disposed in said chamber member for opening and closing said port, said members having confronting surfaces of revolution, one of said surfaces having a recess therein which is concentric with said port when said body member is in one of its given positions, and a resilient sealing ring of solid cross section preformed to a concavo-convex configuration in the plane of the face thereof, said ring being slightly compressed between the base of said recess in one member and the confronting surface of the other member, said recess being slightly wider than the width of said sealing ring in its slightly compressed condition, whereby fluid under pressure reaching the sealing ring will augment the sealing pressure and effect a tighter joint.

7. The structure of claim 6 further characterized by the ring being normally of a substantially circular cross section but in use under compression being of a generally oval cross-section.

8. In a valve structure, a casing member having a valve bore therein and a port communicating therewith, a plug member rotatable in said bore into open and closed positions with respect to said port, one of said members having a generally circular recess therein in the interface area between the members and on an axis angular to the axis of rotation of the members, and annular sealing means of substantially circular cross-section disposed in said recess and deflectable under pressure to a generally oval cross-section to prevent leakage between said members when the plug member is in one of said positions by establishing a tighter fit between said plug member and said casing member as the fluid pressure at the port increases, and a circular retainer encircled by said annular sealing means and loosely maintaining the sealing means in place in said recess whereby the sealing means can move under pressure deflection.

9. In a valve structure, a casing member having a valve bore therein and a port communicating therewith, a plug member rotatable in said bore into open and closed positions with respect to said port, one of said members having a generally circular recess therein in the interface area between the members and on an axis angular to the axis of rotation of the members, annular sealing means of substantially circular cross-section disposed in said recess and deflectable under pressure to a generally oval cross-section to prevent leakage between said members when the plug member is in one of said positions by establishing a tighter fit between said plug member and casing member as the fluid pressure at the port increases, and means for holding said sealing means in said recess comprising an insert between which and the associated member the sealing means is deflected under the compressive force of the fluid pressure.

CLYDE A. BROWN.

REFERENCES CITED

The following references are of record in the file of this patent:

UNITED STATES PATENTS

| Number | Name | Date |
|---|---|---|
| 888,506 | Kellow | May 26, 1908 |
| 1,999,496 | Adams | Apr. 30, 1935 |
| 862,143 | Duffy | Aug. 6, 1907 |
| 1,252,490 | Peris | Jan. 8, 1918 |
| 1,743,015 | Crosby | Jan. 7, 1930 |
| 1,872,417 | Dalldorf | Aug. 16, 1932 |
| 2,233,074 | Corbin | Feb. 25, 1941 |
| 2,310,583 | Johnson | Feb. 9, 1943 |
| 2,201,895 | Glen | May 21, 1940 |
| 2,290,349 | Ohls | July 21, 1942 |
| 2,297,161 | Newton | Sept. 29, 1942 |
| 207,871 | Horton | Sept. 10, 1878 |

FOREIGN PATENTS

| Number | Country | Date |
|---|---|---|
| 370,228 | Italy | Apr. 11, 1939 |